United States Patent
Fuchs

(10) Patent No.: US 6,561,556 B2
(45) Date of Patent: May 13, 2003

(54) CLOSURE CLAMP

(75) Inventor: Rainer Fuchs, Frankfurt (DE)

(73) Assignee: DE-STA-CO Metallerzeugnisse GmbH, Steinbach (DE)

( * ) Notice: Subject to any disclaimer, the term of this patent is extended or adjusted under 35 U.S.C. 154(b) by 174 days.

(21) Appl. No.: 09/937,694

(22) PCT Filed: Jan. 22, 2001

(86) PCT No.: PCT/DE01/00250

§ 371 (c)(1),
(2), (4) Date: Sep. 28, 2001

(87) PCT Pub. No.: WO01/58773

PCT Pub. Date: Aug. 16, 2001

(65) Prior Publication Data

US 2002/0153733 A1 Oct. 24, 2002

(30) Foreign Application Priority Data

Feb. 12, 2000 (DE) .......................................... 100 06 354

(51) Int. Cl.⁷ .............................................. B65D 45/34
(52) U.S. Cl. .................. 292/256.69; 292/113; 292/250; 292/DIG. 49
(58) Field of Search ................................ 292/113, 247, 292/250, 256.69, DIG. 49

(56) References Cited

U.S. PATENT DOCUMENTS

| 4,212,606 | A | * | 7/1980 | Sachleben, Sr. ............ 292/113 |
| 4,493,133 | A | * | 1/1985 | Nilsson ....................... 292/247 |
| 5,165,148 | A | * | 11/1992 | Fleischer et al. ........... 292/113 |
| D364,082 | S | * | 11/1995 | Weinerman et al. ......... D8/331 |
| 5,667,261 | A | | 9/1997 | Weinerman et al. |
| 6,041,721 | A | * | 3/2000 | Weston ................. 292/DIG. 49 |

FOREIGN PATENT DOCUMENTS

DE 90 16 964 4/1992

* cited by examiner

Primary Examiner—Anthony Knight
Assistant Examiner—Chris Boswell
(74) Attorney, Agent, or Firm—Collard & Roe, P.C.

(57) ABSTRACT

The invention is concerned with a closure clamp, comprising a carrier element (1) provided with a bearing (2), and a clamping lever (3) pivotable thereto, wherein one end (31) thereof is connected to the bearing (2) while the second end thereof includes a handle (32). To that effect, a pivotally arranged clamping element (5) is disposed on the clamping lever (3) between the bearing (2) and the handle (32) to detachably connect a locking element (6) provided on the W side of the bearing (2) facing away from the handle, to the carrier element (1). Provision is made according to the invention that, for swivelling the clamping element (5), the same is provided, on the side facing the handle, with a hand-operated lever (7).

6 Claims, 2 Drawing Sheets

CLOSURE CLAMP

CROSS REFERENCE TO RELATED APPLICATIONS

Figure 1:
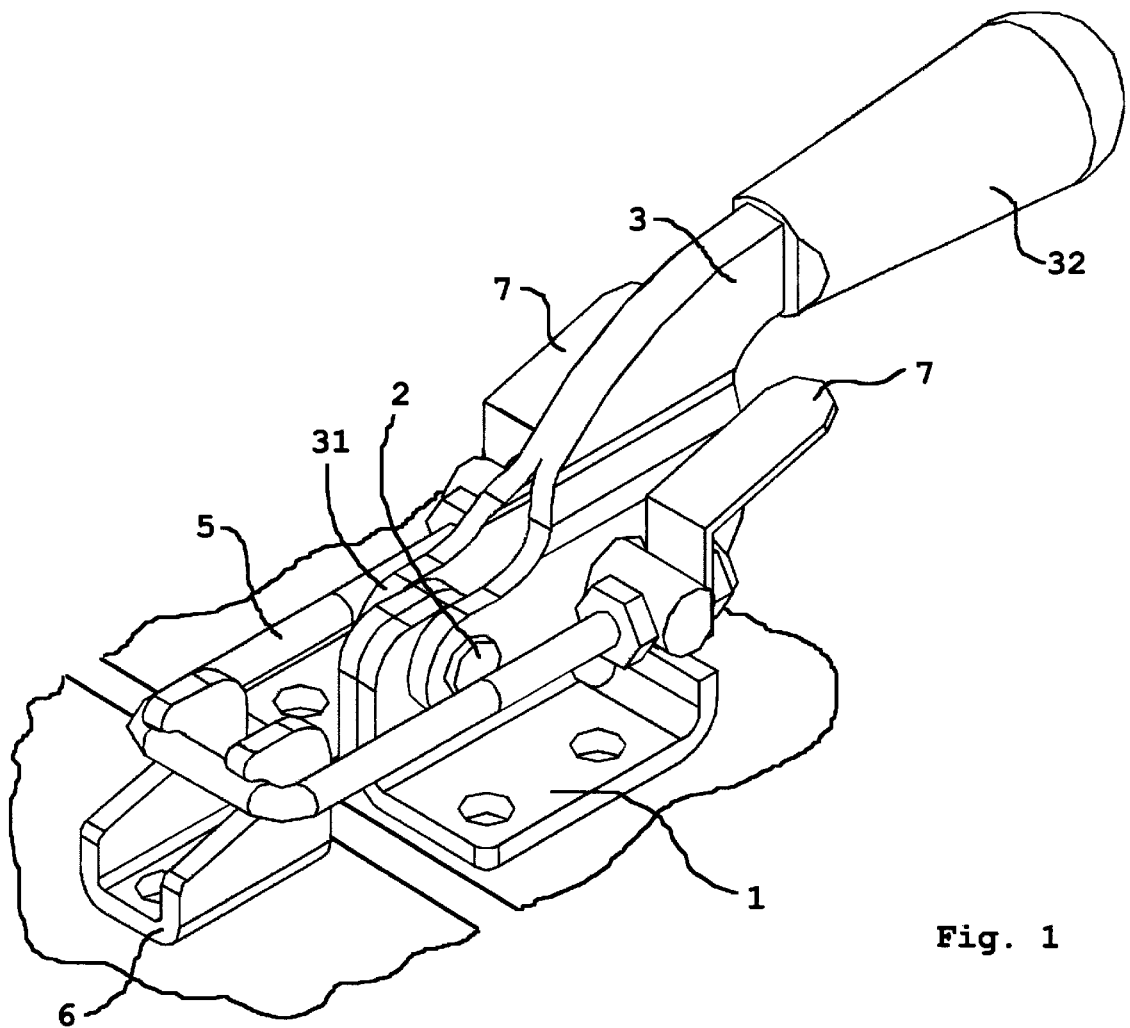

Applicant claims priority under 35 U.S.C. §119 of German Application No. 100 06 354.3 filed Feb. 12, 2000. Applicant also claims priority under 35 U.S.C §365 of PCT/DE01/00250 filed on Jan. 22, 2001. The international application under POT article 21(2) was not published in English.

BACKGROUND OF THE INVENTION

1. Field of the Invention

The present invention is concerned with a closure clamp, comprising a carrier element provided with a bearing, and a clamping lever swivable relative thereto the one end of which is connected to the bearing and the second end of which comprises a handle, with a clamping element being pivotally disposed on the clamping lever between the bearing and the handle and detachably connecting a locking element arranged on the side of the bearing facing away from the handle, to the carrier element.

2. Description of the State of Art

A closure clamp of the afore-described type is known from DE 90 16 964 U1. Closure clamps of this type in conjunction with their locking element in which the clamping element is hanging, serve for tightly or closely clamping any sort of parts together, wherein the locking element is firmly arranged on one of the parts and the carrier element along with the clamping lever and the clamping element in alignment therewith is tightly arranged on the second of these parts. In the opening position of the clamping lever, the clamping element swivably disposed thereon is placed above the locking element which, during restoring of the clamping lever to the clamping position, gets in abutment with the correspondingly formed locking element tightening the same, with the clamping lever being pressed downward to the dead center position or a position slightly thereabove corresponding to the final clamping position.

The afore-described conventional closure clamps, actually, are satisfactory in operation. However, for safely opening a closure of this type, in the past, both of the user's hands have always been needed: one for operating the clamping lever and one for putting back the clamping element on the clamping lever (opening position). Using only one hand results in that the clamping element, in the opening position, remains in the area of the locking element thus involving the disadvantage, for example, when removing the part to which the locking element is fixed, that the locking element and the clamping element might, inadvertently, get stuck. Accordingly, provision will have to be made to the effect that the clamping element be removed from the area of the locking element. Accordingly, the closure clamp according to DE 90 16 964 U1 renders it difficult to rapidly and, if possible, simultaneously open a plurality of such clamps due to the need of using both hands for one clamp. This is the more so disadvantageous as, basically, in the majority of fields of applications, a multiplicity of closure clamps of this type are required to be operated.

OBJECTS AND SUMMARY OF THE INVENTION

Accordingly, it is the object of the invention to improve the closure clamp of the afore-mentioned type in a simple way, to the effect that the same can be readily placed, by using only one hand, in the opening position without getting stuck.

This problem, in the practice of the invention, is solved by a closure clamp of the afore-mentioned type in that for swivelling the clamping element, the same is provided, on the side facing the handle, with a hand-operated lever.

Proceeding from the final clamping position, the way of operation of the closure clamp is as follows: First, the clamping lever is embraced by one the user' hands, thereby disengaging the clamping element from the locking element, yet causing it, correspondingly arranged, to stay thereon under the effect of gravity. Next, the clamping element, with the aid of the lever of the invention, is swivelled back to such an extent that it continues to rest on the clamping lever, it being of deciding importance that it is only the lever facing the handle (which, as a rule, is operated by the user's thumb) that enables the entire opening process to be carried out with one of the user's hands only. Resorting to the user's second hand can be foregone, i.e. the second hand can be used for example, to simultaneously open another clamping device.

After the clamping element along with the lever of the invention having been swivelled out of the area of the locking element, basically, no additional handles are required. However, especially in a vibrating background it has proved advantageous to completely fold back the clamping lever along with the clamping element, i.e. to place it in the position that corresponds to the final clamping position, involving, however, the difference that the clamping element now is quasi safely deposited on the clamping lever, being unable to automatically move into the area of the locking element. The two parts originally clamped together, in that condition, can be readily separated from one another.

Preferred embodiments have been set out in the dependent claims.

Figure 2:
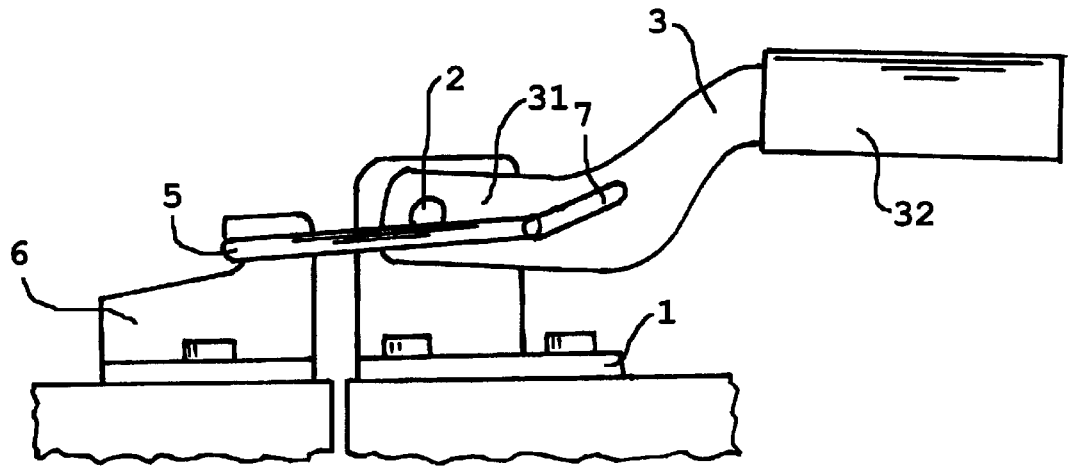
Figure 3:
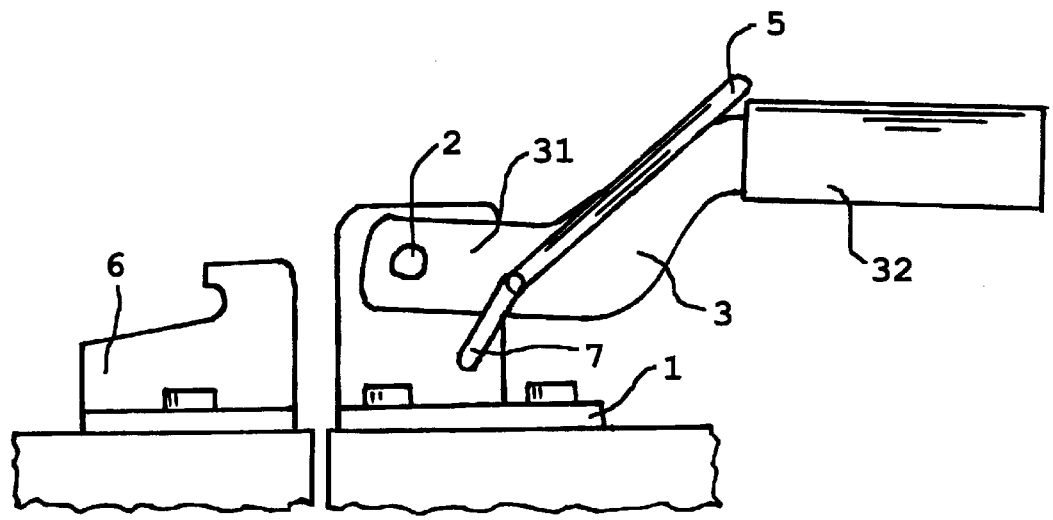

The closure clamp of the invention and the preferred designs thereof as set out in dependent claims 2 to 5 will be described hereinafter in closer detail with reference to graphical illustrations of two forms of embodiment, wherein FIG. 1 is a perspective view of a preferred form of embodiment of the closure clamp;

FIG. 2 is a side view of another form of embodiment of a closed closure clamp; and FIG. 3 shows the closure clamp of FIG. 2 in the opening position.

Referring to the drawings, FIG. 1 shows the closure clamp of the invention, comprising a carrier element 1 formed of sheet metal and being provided with a bearing 2, and further comprising a clamping lever 3 pivotable relative to the carrier element, with one end 31 the said lever 3 being connected to a bearing 2 and the other thereof comprising a handle 32 made of plastic material.

To that effect, a pivotally arranged clamping element 5 is provided on the clamping lever 3 between the bearing 2 and the handle 32 to detachably connect a locking element 6 arranged on the side of the bearing 2 facing away from the handle, to the carrier element 1, with the two parts to be interconnected being shown only schematically.

It is of relevance to the afore-described closure clamp that for swivelling the clamping element the same be provided, on the side facing the handle, with a hand-operated lever 7.

The said lever 7 enables the clamping element 5 to be swivelled independently of the said clamping lever 3, with the lever 7 being always so arranged that despite an enclosure of the handle by one of the user's hands, it can be readily operated, for example, by the thumb of the same user's hand.

As shown in FIG. 1, provision has preferably been made that the clamping element 5 is not designed as a one-armed but rather as a U-shaped clamping bracket, the two free ends of which are pivotally mounted on the clamping lever 3, resulting in a uniform distribution of force during the clamping process and enabling, as shown, the provision of a lever 7 on each of the two ends of the U-shaped clamping element, thereby permitting both left-handed and right-handed persons to use the clamping device. Beyond that, this improved design allows the user to operate one closure clamp by his right hand and to simultaneously operate another closure clamp by his left hand.

As to operating comfort of the closure clamp in terms of ergnometry, it is provided, as shown in FIG. 1, that the lever 7 is of a tapered configuration and designed to have approximately the width of a thumb. Hence, the lever is in the form of a flat tongue which is advantageous for thumb-operation. Alternatively, as shown by the embodiment of FIGS. 2 and 3, the clamping element 5 is designed in the form of a two-armed lever, with one of the arms forming the hand-operated lever 7, i.e. it is a component part of the clamping element 5.

What is claimed is:

1. A closure clamp comprising a carrier element provided with a bearing, a clamping lever pivotable relative to the carrier element, with one end of the clamping lever being connected to the bearing and another end thereof being provided with a handle, a pivotally arranged clamping element provided on the clamping lever between the bearing and the handle to detachably connect a locking element located on the side of the bearing facing away from the handle to the carrier element, and a hand-operated lever arranged on the side facing the handle for swivelling the clamping element.

2. A closure clamp according to claim 1, wherein the clamping element is a two-armed lever, with one of the arms forming the hand-operated lever.

3. A closure clamp according to claim 1, wherein the clamping element is a U-shaped clamping bracket having two free ends pivotally arranged on the clamping lever.

4. A closure clamp according to claim 3, wherein a respective one of the hand-operated levers is arranged on each free end of the u-shaped clamping bracket.

5. A closure clamp according to claim 1, wherein the hand-operated lever is of a flattened configuration and has a width approximately corresponding to the user's thumb.

6. A closure clamp according to claim 1, wherein the hand-opened lever is separate from the clamping element.

* * * * *